Feb. 15, 1927. 1,617,951
W. JORDAN
REEL SEAT
Filed Sept. 17, 1926
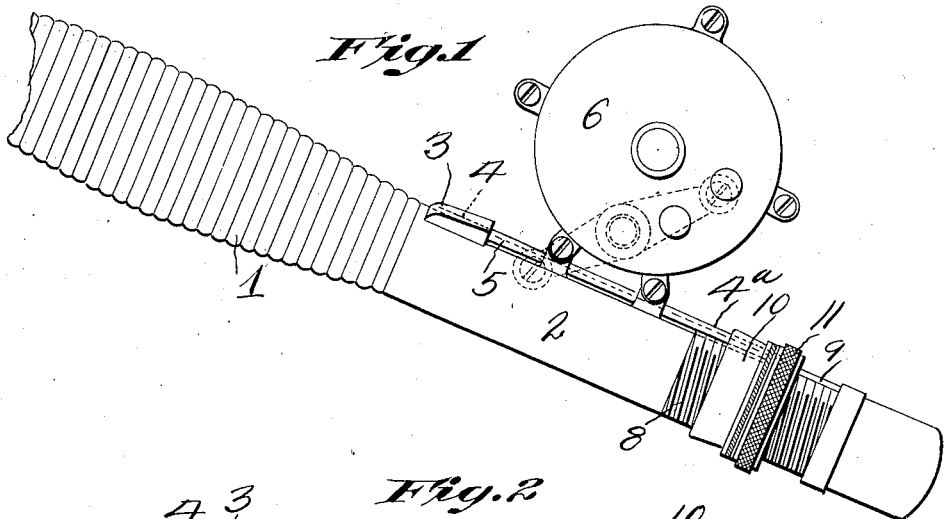
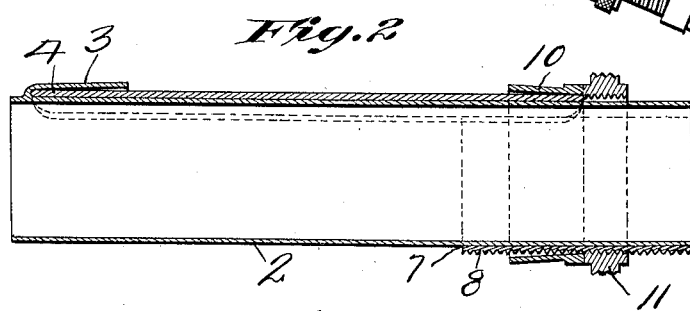
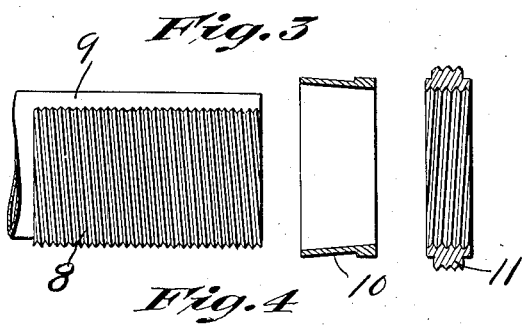
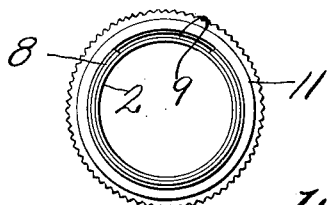
Wesley Jordan,
Inventor
by George J. Utsch
his Atty Patented Feb. 15, 1927.

1,617,951

UNITED STATES PATENT OFFICE.

WESLEY JORDAN, OF SOUTH BEND, INDIANA, ASSIGNOR TO SOUTH BEND BAIT CO., OF SOUTH BEND, INDIANA, A CORPORATION OF INDIANA.

REEL SEAT.

Application filed September 17, 1926. Serial No. 136,086.

The invention relates to fishing reel seats for fishing rods, and has for its object to provide a seat having a reel plate receiving socket at one end thereof and a fixed threaded sleeve having a relatively large slot or interruption therein at the other end of the seat, and in which slot is received the other end of the reel plate and with which reel plate end a tapered sleeve engages, which tapered sleeve is axially moved and forced to jamming position by means of a jam nut threaded on the interrupted threaded sleeve.

A further object is to provide a fishing reel plate jamming sleeve independent of a jam nut thereby insuring a positive holding of the plate and at the same time obviating friction which is one of the common objections now experienced where the sleeve and nut are formed integral.

A further object is to extend the interrupted threaded sleeve substantially three quarters around the reel seat tube and to make the interruption therein the same width as the reel plate, whereby its sides will cooperate with the sides of the reel plate, and rigidly hold said reel plate against side movement, and at the same time the threaded sleeve is thoroughly braced at all times.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a side elevation of a portion of a fishing rod handle, showing the reel seat.

Figure 2 is a vertical longitudinal sectional view through the reel seat.

Figure 3 is a detail collective view of a portion of the reel seat, the tapered sleeve and the jam nut, showing the parts in position to be assembled.

Figure 4 is an end view of the reel seat.

Referring to the drawing, the numeral 1 designates the handle of the fishing rod and 2 a tubular member carried thereby. Rigidly carried by one end of the tubular member 2 is a socket 3 which receives therein the end 4 of the reel plate 5 which reel plate carries a conventional form of reel 6. Reel plate 5 has its underside concaved for snugly fitting the outer periphery of the tubular member 2. Secured to the tubular member 2 adjacent one end thereof, and preferably by welding at 7 is a threaded sleeve 8. The threaded sleeve 8 extends preferably about three quarters of the way around the tubular member 2, thereby forming a longitudinally disposed slot or recess 9 on the upper side of the tubular member 2 and in alinement with the socket 4, and receives therein the end 4ª of the reel plate 5. It will be noted that the reel plate end 4ª extends a substantial distance into the recess or slot 9, consequently is thoroughly braced by engagement with the ends of the threaded sleeve 8, and true alinement is maintained as well as side movement of the end 4ª is prevented during the tightening operation.

Surrounding the sleeve 8 and slidably movable thereover is a tapered sleeve 10, which tapered sleeve when moved towards the reel 6 engages over the end 4ª of the reel plate 5 and holds said plate end 4ª in position, and at the same time there is an axial engagement of the sleeve 10 as distinguished from a rotating frictional engagement which is the common difficulty experienced with sleeves where they are formed as a part of the jam nut. Sleeve 10 is forced and held in jamming engagement with the reel plate end 4ª by the jam nut 11, which nut is threaded on the threaded sleeve 8. It will be noted that when the jam nut 11 is tightened it will engage the outer end of the sleeve 10 and will force the same inwardly onto the reel plate end 4ª, and side twisting of the reel plate end 4ª is obviated, and a positive holding is insured. The reel plate end 4ª is preferably of the same width as the slot 9, consequently the opposite sides thereof engage the walls formed by the slot in the sleeve 8, consequently the plate end 4ª is positively braced as well as the tubular member 2 at its point of greatest strain, therefore the tubular member 2 is not only thoroughly braced, but will be prevented from being crushed, incident to the strain, and can be made of relatively light material.

From the above it will be seen that a fishing reel seat is provided which is simple in construction, the parts reduced to a minimum, and one wherein the reel seat plate is held by an axially movable non-rotating sleeve, moved and held by a rotatable jam nut.

The invention having been set forth what is claimed as new and useful is:—

1. A reel seat comprising a tubular member, a reel receiving socket adjacent one end of the tubular member, a sleeve carried by the other end of the tubular member and having a longitudinally disposed slot in alinement with the socket for the reception of a reel plate end, a jam nut threaded on said sleeve and extending across the slot, and a tapered sleeve longitudinally movable over the threaded sleeve and with which the jam nut cooperates.

2. The combination with a fishing reel seat, a sleeve carried by said seat and having threads thereon and a longitudinally disposed slot, a reel plate extending into said slot, of a sleeve surrounding the threaded sleeve and engaging the reel plate end, and a jam nut threaded on the threaded sleeve and cooperating with said last named sleeve.

3. The combination with a fishing reel seat comprising a cylindrical member having a socket at one end for the reception of a plate end, an interrupted threaded sleeve at the other end for the reception of a reel plate end, of a tapered sleeve longitudinally movable over the threaded sleeve, and a jam nut threaded on the threaded sleeve and forming means whereby the tapered sleeve may be axially moved over the reel plate end.

4. A reel seat comprising a cylindrical member, a socket at one end of said cylindrical member for the reception of a reel plate end, a relatively long threaded sleeve at the other end of the cylindrical member and having a longitudinally disposed slot in alinement with the socket, the reel plate being of substantially the same width as the slot in the threaded sleeve and engaging the walls of said slot, an axially movable jamming sleeve surrounding the threaded sleeve, and a jam nut threaded on the threaded sleeve and forming means whereby the jamming sleeve is axially moved without rotation.

5. The combination with a fishing reel seat having a reel plate end disposed in a slot of an interrupted threaded sleeve, of an axially movable non-rotatable jamming sleeve, and a rotatable jamming nut threaded on the sleeve and cooperating with the jamming sleeve.

In testimony whereof I affix my signature.

WESLEY JORDAN.